Patented May 23, 1933

1,910,679

UNITED STATES PATENT OFFICE

JOHN WILLIAM CROOM CRAWFORD, OF CRICKLEWOOD, LONDON, AND FRANCIS GEORGE WILLSON, OF WOOLWICH, LONDON, ENGLAND, ASSIGNORS TO MONSANTO CHEMICAL WORKS, OF ST. LOUIS, MISSOURI

PRODUCTION OF HYDROXYLIC COMPOUNDS

No Drawing. Application filed April 14, 1927, Serial No. 183,896, and in Great Britain April 28, 1926.

This invention relates to the production of hydroxylic compounds from amines in an improved manner. It is well known that hydroxylic compounds can be obtained from amines by treating primary amines with nitrous acid and allowing the products to decompose in aqueous solution. In most cases, however, the yield of hydroxylic derivatives is much reduced by the simultaneous formation of by-products, so that the actual yields obtained are poor. These by-products are often largely derived from interaction between the hydroxylic compound and the undecomposed product of the reaction between nitrous acid and the amine. Again, it is usually necessary to operate in dilute solutions so that the plant output is small. Further, it has been proposed to distill off the hydroxylic derivatives in steam, but owing to their relatively low volatility large quantities of steam are usually required.

It has now been found that it is possible to remove the hydroxylic compound progressively as it is formed by the aid of a solvent therefor, provided such solvent is substantially not miscible with the aqueous medium in which the product from amine and nitrous acid undergoes decomposition, and further, that higher yields are obtainable and stronger solutions can be utilized; also, steam distillation can be avoided.

The invention consists in treating the amine in suitable solution, and at an appropriate temperature, with nitrous acid or a nitrite and bringing about the decomposition of the resulting product in the presence of a suitable solvent for the hydroxylic compound not substantially miscible with the solution, by means of which the removal of the hydroxylic compound from the aqueous solution is effected progressively immediately following its formation.

The invention further consists in bringing the solvent into intimate mixture (e. g. by emulsification) with the solution during the reaction, whereby removal of the hydroxylic compound from the other reaction products is facilitated.

The invention also consists in separating the solvent carrying the hydroxylic compound from the reaction mixture, and separating the solvent from the hydroxylic compound in any suitable manner, e. g., by fractional distillation or precipitation or by suitable chemical means.

The decomposition of the product of the action of nitrous acid on the amine may, of course, be assisted by the addition of suitable catalysts, for example, metallic salts such as copper sulphate, and the precise manner of carrying the invention into effect may be arranged so as to permit of continuous operation.

The following examples serve to illustrate various applications of the invention, but it is to be understood that the carrying into effect of the new procedure is not limited to the particular substances nor to the particular conditions of temperature, concentration, solvents, etc., chosen for these illustrative examples.

Example 1

Aniline (47 g.) is dissolved in 310 ccs. of 25% (weight/volume) sulphuric acid, and 190 ccs. of water added. A strong solution of sodium nitrite in water is then added at below 5° C. until a slight excess of nitrous acid is present, as shown by the starch iodide test. The solution is then added gradually to a boiling, efficiently agitated, mixture of 250 ccs. of xylene and 25 ccs. of water under a reflux condenser. The mixture is then cooled, the xylene layer separated, and the aqueous layer extracted with ether. The combined non-aqueous solutions are then extracted with aqueous sodium hydroxide, the alkaline liquor separated, acidified, and the phenol extracted with ether, from which it is finally separated by fractional distillation. Yield, 43 g., or 90.6% of the theoretical.

Example 2 p-Toluidine (27 g.) is dissolved in 250 ccs. of 24% sulphuric acid, and the solution treated at below 5° C. with a strong aqueous solution of sodium nitrite until reaction is complete as shown by the starch iodide test. The solution is then added gradually to a boiling, well agitated mixture of 25 ccs. of 24% sulphuric acid and 250 ccs. of xylene under a reflux condenser. On completion of the addition, the xylene layer is separated and the p-cresol extracted therefrom by means of aqueous sodium hydroxide, the alkaline extract acidified, the precipitated p-cresol extracted with ether, the ethereal extract dried, and the p-cresol fractionated after removal of the solvent by distillation. The yield obtained is about 25 grammes (92% of the theoretical) and the boiling point is about 195–205° C.

*Example 3* p-Chloroaniline (64 g.) is dissolved in 310 ccs. of 25% sulphuric acid and 190 ccs. of water added. The solution is then treated with a solution of 35 g. of sodium nitrite in the minimum quantity of water at below 5° C. and the mixture added gradually to a boiling well agitated mixture of 500 ccs. of xylene and 25 ccs. of 25% sulphuric acid under a reflux condenser. The mixture is then cooled, the xylene layer separated, and the p-chlorophenol extracted with dilute aqueous sodium hydroxide. The alkaline layer is separated from the xylene, the phenol liberated with acid and extracted with ether, and the ethereal extract fractionated. Yield, 49 g. or 76.7% of the theoretical.

*Example 4* m-Aminobenzaldehyde (30.25 g.) in 200 ccs. of 25% sulphuric acid is diazotized with 17.5 g. of sodium nitrite in aqueous solution, and the mixture added gradually to a boiling, well agitated mixture of 180 ccs. of chlorobenzene and 5 ccs. of water under a reflux condenser. A small amount of tar, insoluble in either layer, is deposited on the walls of the reaction vessel. The reaction mixture is cooled, whereupon m-hydroxybenzaldehyde (24 g.) crystallizes out, and is collected by filtration. A further 5 g. of m-hydroxybenzaldehyde is obtained by treating the mother liquors in the manner described in Example 1 above. Total yield, 29 g., or 95.0% of the theoretical.

*Example 5*

Aniline (23 g.) is dissolved in 210 ccs. of 24% sulphuric acid and treated with a strong aqueous solution of sodium nitrite at about 0° C. until a slight excess of nitrous acid is present, as indicated by the starch iodide test. The solution is then added gradually to a boiling, well agitated mixture of 250 ccs. of anisole and 25 ccs. of 24% sulphuric acid under a reflux condenser. The mixture is cooled, the anisole layer separated, and the aqueous layer extracted with a further proportion of anisole. The combined anisole extracts are extracted with aqueous sodium hydroxide, the alkaline layer separated, acidified, and the phenol extracted with ether, from which it is finally separated by fractional distillation. Yield 22.5 g. or about 97% of the theoretical; boiling point, 179–182°.

*Example 6* m-Xylidine (1-amino-2:4-dimenthylbenzene) (30.25 g.) is dissolved in 250 ccs. of 24% sulphuric acid and treated with a strong aqueous solution of sodium nitrite at about 0° C. until the starch iodide test indicates the presence of excess of nitrous acid. The solution is added gradually to a boiling, well stirred mixture of 25 ccs. of water and 250 ccs. of xylene under a reflux condenser. The xylene layer is separated after cooling, and extracted with aqueous sodium hydroxide. The alkaline extract is separated and acidified, and the xylenol extracted with ether, and the ethereal extract dried and fractionated. Yield, 26 g., or 85% of the theoretical; boiling point 103–105°/20 mm.

*Example 7*

Anthranilic acid (34 g.) is dissolved in 250 ccs. of 24% sulphuric acid and treated at about 0° with a solution of 18 g. of sodium nitrite in the minimum of water. The solution is then added gradually to a boiling, well stirred mixture of 250 ccs. of xylene and 25 ccs. of 24% sulphuric acid under a reflux condenser. The mixture is cooled, the xylene layer separated and extracted with aqueous sodium hydroxide. The alkaline extract is then acidified, and the precipitated salicylic acid filtered off and recrystallized. Yield, 30 g. or about 75% of the theoretical.

The present process is not amenable to the production of certain types of hydroxylic compounds, e. g., (a) those hydroxylic compounds which, at the temperature at which the decomposition of the product of the action of nitrous acid on the corresponding amine is carried out, have such high solubilities in water that they cannot be extracted from an aqueous medium under these conditions by any solvent non-miscible with water; (b) those hydroxylic compounds which also function as bases sufficiently strong to be present in the aqueous medium as salts, from which they cannot be extracted by non-aqueous solvents.

In the case of an amine, the product of the reaction of nitrous acid on which requires a high temperature for its decomposition into the corresponding hydroxylic compound, the above procedure may be carried out at an increased pressure in order that the boiling point of the system may be correspondingly raised.

Having now described our invention, what we claim as new and desire to secure by Letters Patent is:—

1. In the process of preparing an aromatic monohydroxy compound selected from the following group: a halogen substituted phenol and a carboxyl substituted phenol, the step which comprises hydrolyzing the product resulting from the diazotization of the corresponding primary aryl monoamine, the hydrolysis being conducted in aqueous solution in the presence of a solvent for the hydroxy compound thereby produced, such solvent being chemically inert with regard to the constituents of the reaction mixture and substantially immiscible with the aqueous solution.

2. In the process of preparing a halogenated phenol the step which comprises hydrolyzing the product resulting from the diazotization of the corresponding halogenated phenyl amine, the hydrolysis being conducted in aqueous solution in the presence of a solvent for the phenol, such solvent being chemically inert with regard to the constituents of the reaction mixture and substantially immiscible with the aqueous solution.

3. In the process of preparing aromatic hydroxy compounds, the step which comprises hydrolyzing the product resulting from the diazotization of a primary aryl amine, the hydrolysis being conducted in aqueous solution in the presence of anisole.

4. In the process of preparing a halogenated phenol, the step which comprises hydrolyzing the product resulting from the diazotization of the corresponding halogenated phenyl amine, the hydrolysis being conducted in aqueous solution in the presence of anisole.

In testimony whereof we have signed our names to this specification.

JOHN WILLIAM CROOM CRAWFORD.
FRANCIS GEORGE WILLSON.